United States Patent [19]

Cervinka

[11] Patent Number: 4,556,243
[45] Date of Patent: Dec. 3, 1985

[54] SAND-DISPENSING DEVICE FOR MOTOR VEHICLES

[76] Inventor: Franz Cervinka, Oberleitenweg 35, A-6370 Kitzbühel, Austria

[21] Appl. No.: 584,253
[22] PCT Filed: Jun. 8, 1983
[86] PCT No.: PCT/AT83/00016
§ 371 Date: Feb. 1, 1984
§ 102(e) Date: Feb. 1, 1984
[87] PCT Pub. No.: WO83/04396
PCT Pub. Date: Dec. 22, 1983

[30] Foreign Application Priority Data

Jun. 11, 1982 [AT] Austria .................................. 2268/82

[51] Int. Cl.⁴ .............................................. B60B 39/04
[52] U.S. Cl. ......................................... 291/25; 291/41; 239/689
[58] Field of Search ............... 239/379, 574, 650, 689; 291/3, 25, 30, 31, 38, 41; 222/476; 137/630.16

[56] References Cited

U.S. PATENT DOCUMENTS

| | | | |
|---|---|---|---|
| 1,501,650 | 7/1924 | Dienstbach et al. | 291/38 |
| 1,669,408 | 5/1928 | Behrens | 291/28 |
| 1,818,815 | 8/1931 | Rothstein | 291/35 X |
| 1,833,084 | 11/1931 | Liedberg | 291/38 |
| 3,885,823 | 5/1975 | Lee | 291/38 X |
| 3,888,524 | 6/1975 | Lee | 291/25 X |
| 3,938,835 | 2/1976 | Lee | 291/38 X |

FOREIGN PATENT DOCUMENTS

| | | |
|---|---|---|
| 853314 | 3/1940 | France . |
| 16023 | of 1913 | United Kingdom . |
| 388059 | 2/1933 | United Kingdom . |

*Primary Examiner*—Jeffrey V. Nase
*Assistant Examiner*—James R. Moon, Jr.
*Attorney, Agent, or Firm*—McGlew and Tuttle

[57] ABSTRACT

To ensure functioning and permanent readiness for operation of a sand-dispensing device for motor vehicles, which comprises a sand container and at least one sand channel with a sand outlet facing the wheel, two closing means are provided. The first one closes the outlet of the sand container, i.e. the passage into the sand channel, and the second one closes the sand outlet. The two closing means open simultaneously, so that the sand is discharged from the sand container directly onto the roadway. To stop dispersion, the outlet of the sand container is closed earlier, so that the sand channel can get discharged. Only then the second closing means closes the sand outlet of the channel and protects the discharged sand channel and the first closing means against humidity and mud.

8 Claims, 7 Drawing Figures

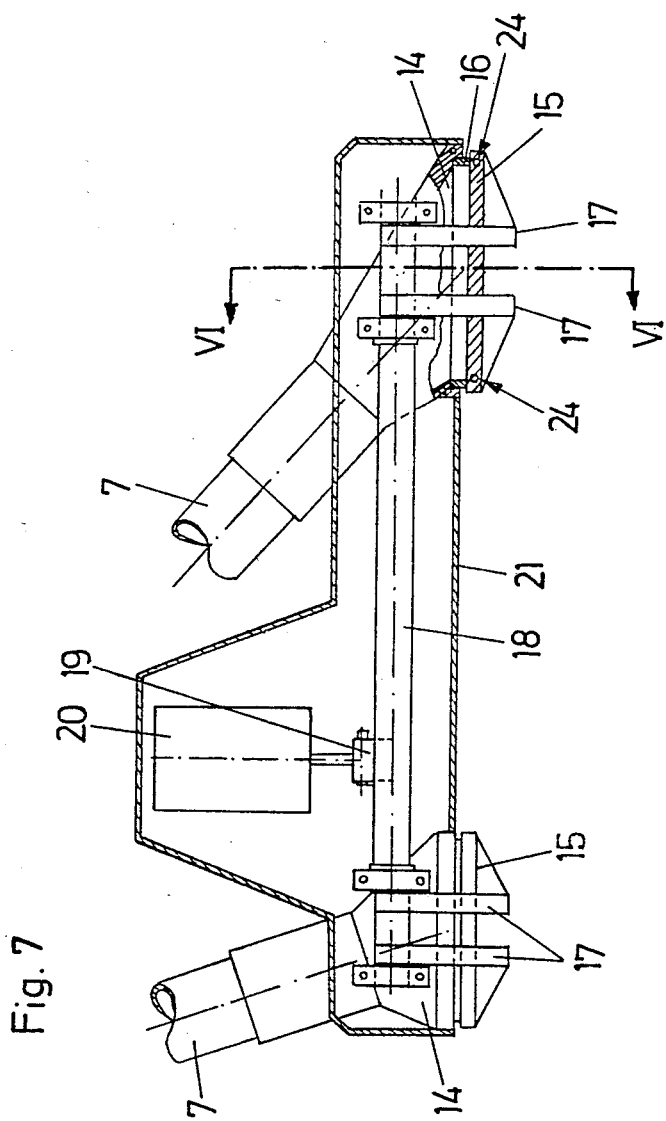

SAND-DISPENSING DEVICE FOR MOTOR VEHICLES

FIELD AND BACKGROUND OF THE INVENTION

This invention relates in general to automobile servicing equipment and in particular to a new and useful device for dispensing an abrasive material onto a roadway in the vicinity of the wheels of a vehicle.

The invention relates to a device for motor vehicles for dispensing sand under the effect of gravity, comprising at least one refillable sand container, a sand channel whose end associated with a wheel of the motor vehicle forms a sand outlet, and comprising two closing means interrupting the sand flow, the first of said means being associated with the outlet of the sand container and the second one forming the sealing of the sand outlet, and their actuation being dependent upon each other.

A sand-dispensing device of this kind can, for example, be found in the U.S. Pat. No. 3,888,524. In this case, an intermediate container is inserted in the sand channel, and the two closing means alternately open and close the inlet and the outlet of the intermediate container which forms the sand outlet. The two closing means are to this end arranged at a common support which is slideable in the intermediate container and whose motion is effected by means of a pressure medium, cable traction or the like. Hence, when the closing means sealing the outlet is in the closed state, sand is located thereon and renders opening of the outlet at least more difficult. At low temperatures, humidity entering from below may cause icing of the sand so that the sand-dispersing device gets out of function. But also closing of the outlet closing means may be disturbed by the sand which flows down during the closing motion because of the simultaneous opening of the inlet closing means.

SUMMARY OF THE INVENTION

It is now the object of the invention to improve the sand dispensing device such that dispersion of sand is ensured at any time and that the closing means facing the sand outlet remains operative without any malfunctions.

According to the invention this is achieved in that both closing means open simultaneously and that the first closing means at the outlet of the sand container closes earlier than the second closing means at the sand outlet.

According to the solution proposed by the invention, the former double function of the sand outlet sealing, i.e., to retain the sand in the container and to protect the sand outlet against mud and wetness, is assigned to the two closing means. The closing means of the sand container retain, in the usual manner, the sand in the container. As they close earlier than the sand outlet sealing, the sand which is still in the sand channel is dispensed, and the sand channel is fully discharged before the closing means of the sand outlet closes. The sand outlet sealing therefore has simply a protective function against wetness and mud, so that the sand is prevented from freezing to the inner side of the sand outlet closing means, and in cases where grit is used as dispensing material, the latter-mentioned is also prevented from getting stuck in the sand channel and in the region of the sand outlet. On the other hand, due to the sealing of the discharged sand channel, the container sealing itself is also protected against wetness, so that here and in the sand container, too, the danger of frozen sand is obviated. The first closing means can, hence, be opened at any time, and the sand remains dispensible. When required, the sand must very rapidly be dispensed in front of the wheels of the vehicle, and therefore the two closing means open simultaneously, and as a result the sand gets immediately from the sand container onto the roadway.

An embodiment of the invention provides that the outlet of the sand container engages in a funnel-like widened portion of the sand channel in which the first closing means are movable. This helps to simplify the construction, as in this embodiment the two closing means are provided at the beginning and at the end of the sand channel. Preferably both closing means are formed by flaps which are pivotable about swivelling axles and open in the flow direction of the sand.

A preferred embodiment further provides that a lever on which a controlled movable actuating element engages projects radially from the swivelling axles of each of the two flaps. A piston which is acted upon by a pressure medium and controlled by a solenoid valve is preferably provided as an actuating element for moving the lever. As a pressure medium as well as electric power are available in every motor vehicle, no additional facilities are required except for the corresponding connections. The actuating element may further also be a part of a lifting magnet, the electric supply line being connectable to the cigarette lighter of the motor vehicle, for example. In this case, an additionally mounted delay relay is provided for the retarded closing motion of the sand outlet flap.

The lever may, however, also be actuated in a different manner, for example by means of a cable traction or the like.

On motor vehicles with twin wheels a separate sand outlet may be assigned to each wheel. For this purpose, a further embodiment of the invention provides that the sand container comprises two funnel-like outlets closable by first flaps, each of said flaps ending in a sand channel which has a sand outlet closable by a second flap, the first and the second flaps being arranged to be actuated in pairs. According to this embodiment, the two flaps, each, are arranged at the two ends of the swivelling axle, with the lever, which cooperates with the common actuating element, projecting from the center part of said axle.

It is further possible to design the sand container with an outlet such that, when used on twin wheels, two sand containers are adapted to be mounted together, so that a second device for twin wheels is not required. Moreover, a single centrally located outlet may also be assigned to the twin wheels.

Below the invention will be described in more detail on the basis of the figures of the appended drawings without being limited by them.

Accordingly it is an object of the invention to provide an improved device for spreading an abrasive material in the vicinity of a vehicles wheel and which includes a container for the material which has an opening which is closable by a first flap, wherein the opening is surrounded by a housing portion leading to a channel passage from the container opening and outwardly to a lower end channel discharge opening which is closable by a second flap and wherein the flaps are operable so that the container openings may be closed first so that the material already fed into the channel will be discharged before the second flap is closed.

A further object of the invention is to provide a device for use in association with the operation with a vehicle which provides means for feeding an abrasive material from one or more supply tanks onto a roadway in the vicinity of the wheels and which includes means for protecting the abrasive material against cold and ice so that the discharge of the material will always be insured.

BRIEF DESCRIPTION OF THE DRAWINGS

In the drawings:

FIG. 7 shows a front view of sand outlets for twin wheels with the front wall of the housing being dismantled, FIG. 5 also being a section along line V—V of FIG. 7.

GENERAL DESCRIPTION OF THE PREFERRED EMBODIMENTS

Figure 1:
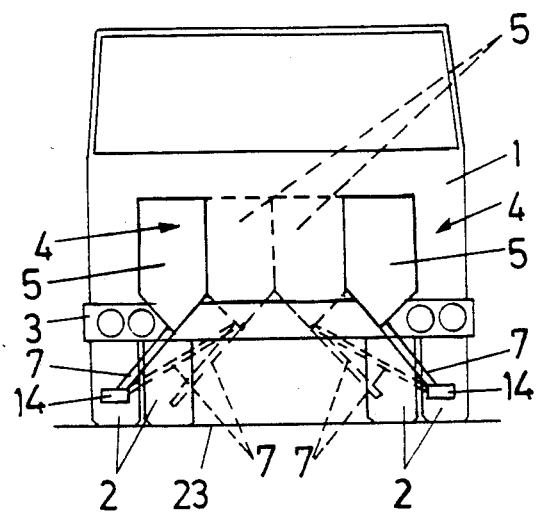
FIG. 1 shows a front view of a motor truck with two (four) schematically depicted sand-dispensing devices mounted at the front bumper.

Referring to the drawings in particular the invention embodied therein comprises a device generally designated 4 for use in dispensing an abrasive material onto a roadway in the vicinity of the wheels 2 of an associated vehicle 1. The device comprises one or more containers 5 for the material and includes a container discharge opening 6 adjacent the bottom of the container which is closable by a first flap 9 which is movable between a closing position shown in dotted lines at 9' which blocks the container discharge opening 6 into an open position shown in dotted lines at 9 permitting the discharge of the material from the container through the container discharge opening 6. Housing means including an enclosure portion 13 surrounds the opening 6 and leads to a channel discharge 7 extending from the opening 6 through a channel discharge passage in the portion 7 downwardly toward the roadway. The channel discharge passage has a lower end with a channel passage discharge opening 16 and a second flap 15 is movable between a closing position blocking the opening 16 to an opening position permitting the discharge of the material from the channel passage. Control means comprising separate controls 12,20 are connected to the respective flaps and permit the separate movement of the flap 9 and the flap 15. So as to permit the first flap to be closed first to stop the exit of material from the container 5 and the second flap remains opened to permit the material already fed into the channel passage to be discharged out of the channel passage. When the second flap is closed the whole system is prevented against dirt, wind and ice sprays etc.

A sand-dispensing device 4 according to the invention is in particular designed for temporary mounting at the bumper 3 of a motor vehicle 1, for example at the front side of a motor truck or a bus. Preferably two sand-dispensing devices 4 are symmetrically arranged at the vehicle 1, as shown in FIG. 1. Each sand-dispensing device 4 comprises a sand container 5, at least one sand channel 7 and one sand outlet 14 for each sand channel. In the illustrated embodiment, one sand channel 7 leads from each sand container 5 to the sand outlet 14 in front of a wheel 2. In the case of twin wheels, a second sand container 5, as indicated by the dotted line, may be mounted for each pair of wheels, or a sand container may be used which has two sand channels 7, with a separate sand outlet 14 being assigned to each wheel of the pair of wheels. If desired, one single sand container 5 with a sand channel 7 may be used for twin wheels, if its sand outlet 14 is substantially centrally arranged in front of the pair of wheels. Out of each sand outlet 14 sand is dispensed onto the roadway 23 in front of or behind the wheel 2. As can in particular be seen in FIGS. 3 and 4, each sand container 5 has at least one funnel-shaped outlet 6 which is closable by a first flap 9. The first flap 9 is secured to a swivelling axle 10 from which a lever 11 projects radially. A first actuating element 12 engages at the end of the lever 11, so that the first flap 9 is pivotable from the open position indicated by continuous lines in FIG. 3 into the closed position (9',11') indicated by dotted lines. The actuating element 12 is secured to the outer side of the sand container 5 in the vicinity of the outlet 6, and for example formed by a pressure cylinder with a piston controlled by a solenoid valve, or by a lifting magnet. The sand channel 7 has a funnel-shaped widened portion 8 in which the movable first flap 9 is arranged. The outlet 6 and the widened portion 8 of the sand channel 7 are surrounded by a wall or jacket to prevent mud and wetness from entering into the first flap 9 or into the widened portion 8.

Figure 5:
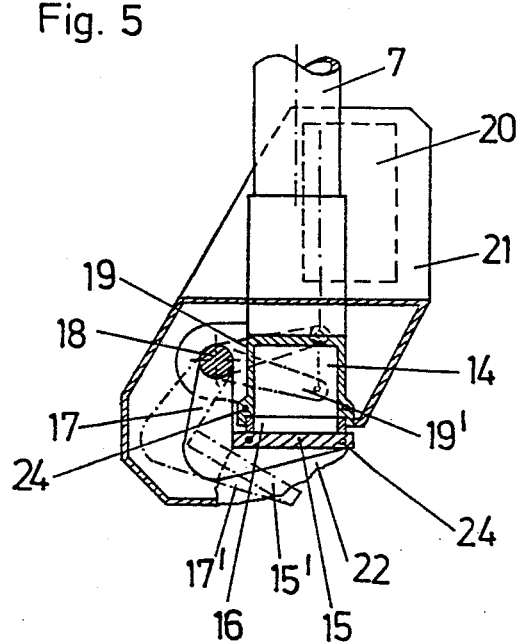
FIG. 5 shows a vertical section through a sand outlet.

FIG. 5 shows the region of the sand outlet of the sand-dispensing device 4 according to the invention in a vertical section through the sand outlet 14 which is arranged at the end of the sand channel 7 and closable by a second flap 15. A gasket 16 is fitted between the opening rim of the sand outlet 14 and the flap 15. The rim region of the sand outlet 14, the contact area of the flap 15, and/or the gasket 16 are preferably electrically heated. Suitable heating wires 24 are in this case arranged at or in these regions. The sand outlet 14 is located in a housing 21 from which the sand channel 7 projects upwardly. In the region of the second flap 15, an opening is provided in the housing 21, which opening is surrounded or closed by a rubber skirt 22 or the like which, however, clears the opening when the second flap 15 is opened, so that sand can flow out of the sand outlet 14. The second flap 15 is fastened to swivelling levers 17 which are torsion-resistantly arranged on a swivelling axle 18. The swivelling axle 18 is laterally rotatably mounted at the sand outlet 14 and provided with a radially projecting lever 19 which cooperates with a second actuating element 20. The latter-mentioned, which is preferably designed like the first actuating element 12, pivots the second flap 15 (open position 15',17',19').

Figure 2:
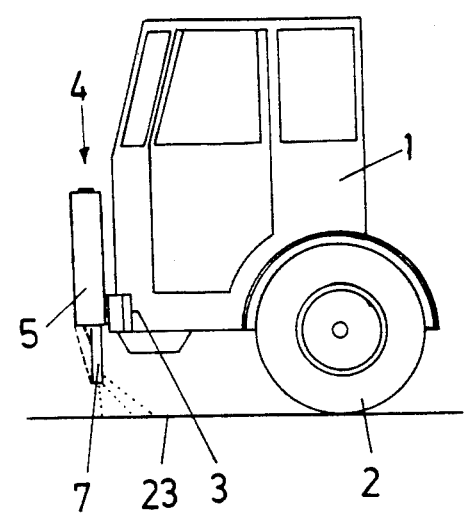
FIG. 2 shows a schematic side view of FIG. 1.
Figure 4:
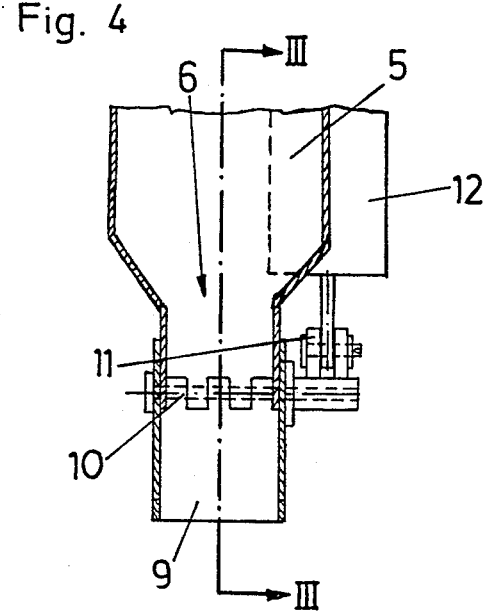
FIG. 4 shows a section along line IV—IV of FIG. 3.
Figure 6:
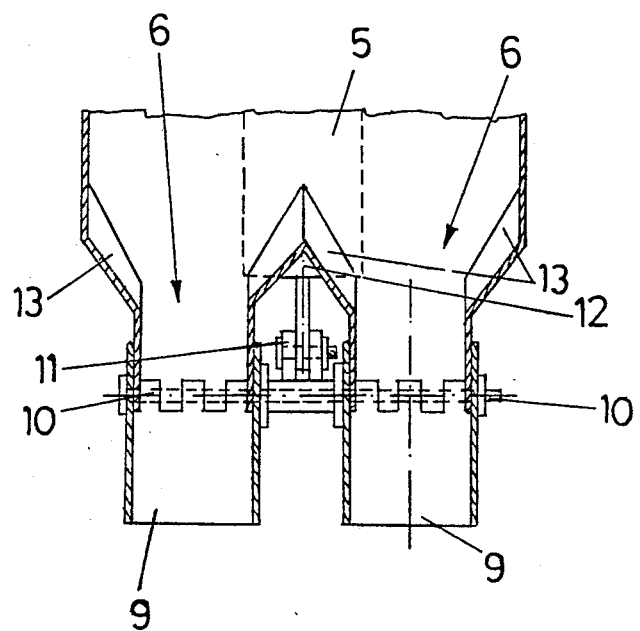
FIG. 6 shows a section along line IV—IV of FIG. 3 of an embodiment of twin wheels.

The embodiment according to FIGS. 6 and 7 shows in detail the sand containers 5, which are indicated with dotted lines in FIGS. 1 and 2, with two sand channels 7 for twin wheels, FIG. 6 corresponding to the illustration according to FIG. 4. In this arrangement, the sand container 5 has two outlets 6. They are commonly closable by first flaps 9, and for this purpose they are secured to the two ends of a common swivelling axle 10, the lever 11 being arranged substantially centrally between the first flaps 9. Inclined surfaces 13 are provided in the sand container 5 for the formation of the two funnel-shaped outlets 6. In the region of the said outlet (FIG. 7), the two sand channels 7 end at the same height above the roadway 23 (FIG. 2). The second flaps 15 of the two sand outlets 14 and therefore also arranged on a common swivelling axle 18, with the lever 19 projecting from its central part. Said lever is also pivoted by an actuating element 20.

Figure 3:
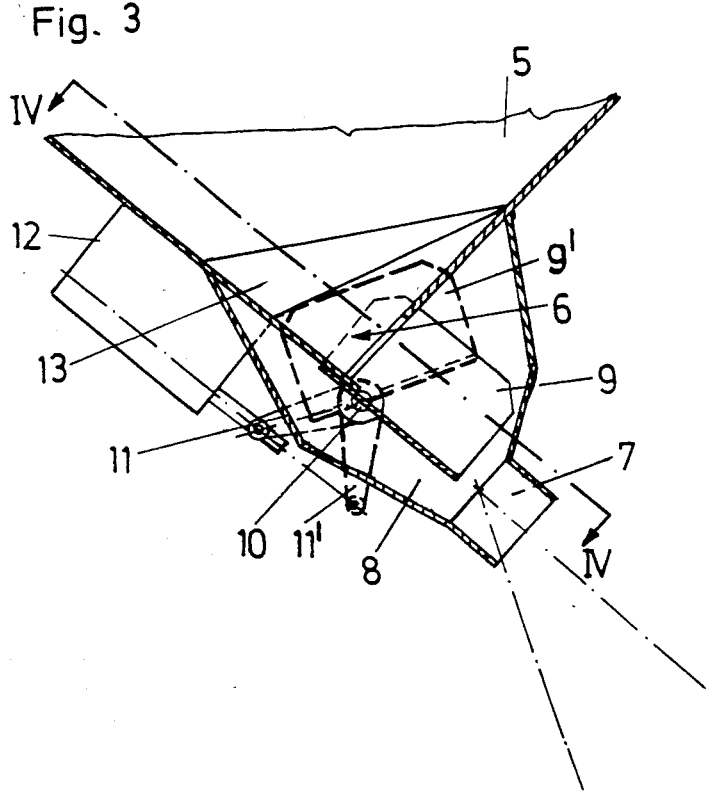
FIG. 3 shows a vertical section through a funnel-shaped outlet of a sand container along line III—III of FIG. 4.

When the sand-dispensing device 4 is put into operation, for example by actuating a switch on the instrument panel or in another easily accessible region of the vehicle 1, the first actuating elements 12 move all first flaps of the sand containers 5 from the closed position according to FIG. 3. At the same time all second flaps 15 of the sand outlets are opened (open position 15') by means of the second actuating elements 20, so that sand is delivered without delay from the sand containers 5 onto the roadway. This is important because in the event of an unexpected encounter with glare ice, dispersion should possibly start upon recognition of the danger. A premature opening of the second flaps 15 would create the danger of wetness or mud entering into the sand outlets 14, and premature opening or keeping open of the first flaps 9 of the sand containers 5 would fill the sand channels 7 with sand which could get clogged or frozen therein. For these reasons, the sand channels 7 must be discharged when not used. Therefore, the flaps 9 and 15 are not simultaneously closed but at a short interval. Actuation of the switch therefore first effects closing of the first flaps 9 (FIG. 3) and closing of the second flaps 15 (FIG. 6) only after sand residues have been discharged from the sand channels 7. The delay is for example effected by means of a delay relay which makes the solenoid valves or lifting magnets of the second actuating means respond after a short time only. Thus, complete discharge of the sand channels 7, on the one hand, and protection against road spray, humidity, wetness and mud, on the other hand, are obtained in an optimal manner. Complete discharge of the sand channel 7 and of the said outlet region will also obviate the danger that the sand outlet flap 15 gets jammed.

I claim:

1. A device for dispensing an abrasive material by gravity onto a roadway in the vicinity of wheels of a vehicle, comprising a container for the material having a container discharge opening adjacent the bottom thereof, a first flap movable between a closing position blocking the container discharge opening to an open position permitting the discharge of the material from the container through the container discharge opening, housing means defining a channel discharge extending around and enclosing the container discharge opening and defining a channel discharge passage extending downwardly toward the roadway for the material exiting through the container discharge opening and having a lower end with a channel passage delivery opening, a second flap movable between a closing position blocking the channel passage discharge opening to an open position permitting the discharge of the material from the channel passage discharge opening, and control means connected to said first and second flaps for permitting separate movement of said flaps to permit the first flap to be closed first to stop the exit of material from the container and the second flap to remain open to permit the material already fed into the channel discharge passage to be discharged out of the channel passage, and then to permit the second flap to be closed, said control means operating to simultaneously move said first and second flaps from their closed position to their open position.

2. A device according to claim 1, wherein there are at least two channel discharge passages and including an actuating shaft extending between said channel discharge passages and having a crank arm adjacent each end connected to a respective flap, said control means comprising a separate control actuator connected to said shaft to rotate said shaft to actuate the respective flaps of the respective channel passages.

3. A device according to claim 1, wherein said control means comprises a first actuating element connected to said first flap and a second actuating element which is separate from said first actuating element and which is connected to said second flap.

4. A device according to claim 3, wherein said channel discharge passage has a downwardly extending gasket around said channel passage discharge opening against which said second flap bears in said closed position of said second flap, second housing means extending around said channel passage discharge opening for shielding said channel passage discharge opening from debris when said second flap is in its open position.

5. A device according to claim 4, including heating means associated with said second flap and said channel passage discharge opening for heating thereof.

6. A device according to claim 1, wherein said container includes a funnel-like widened portion engaging around said container discharge opening and containing said first flap, said channel discharge passage being connected to said widened portion.

7. A device according to claim 6, wherein said control means comprises a first actuating element connected to said first flap and a second actuating element which is separate from said first actuating element and which is connected to said second flap.

8. A device according to claim 7, wherein each of said first and second flaps is mounted for pivoting about its own swivel axis, a lever connected to each of said first and second flaps and extending radially from said swivel axis, said first and second actuating elements being connected to said lever of said first and second flaps respectively, said first and second flaps being pivotable into their respective open positions into a direction of flow of abrasive material through said container discharge opening and said channel passage delivery opening respectively.

* * * * *